(12) United States Patent
Takatsuji et al.

(10) Patent No.: US 6,493,957 B1
(45) Date of Patent: Dec. 17, 2002

(54) BALL STEP GAUGE

(75) Inventors: Toshiyuki Takatsuji, Tsukuba (JP); Sonko Osawa, Tsukuba (JP); Tomizo Kurosawa, Tsukuba (JP); Hironori Noguchi, Tsukuba (JP)

(73) Assignee: Japan as represented by Director General of Agency of Industrial Science and Technology, Tokyo (JP)

(*) Notice: Subject to any disclaimer, the term of this patent is extended or adjusted under 35 U.S.C. 154(b) by 0 days.

(21) Appl. No.: 09/720,793

(22) PCT Filed: Mar. 30, 2000

(86) PCT No.: PCT/JP00/02021

§ 371 (c)(1), (2), (4) Date: Dec. 29, 2000

(87) PCT Pub. No.: WO00/79216

PCT Pub. Date: Dec. 28, 2000

(30) Foreign Application Priority Data

Jun. 18, 1999 (JP) .............................. 11-172290

(51) Int. Cl.$^7$ .............................. G01B 1/00; G01B 3/30
(52) U.S. Cl. .............................. 33/502; 33/567; 73/1.79
(58) Field of Search .............................. 33/502, 503, 567; 73/1.79, 1.01

(56) References Cited

U.S. PATENT DOCUMENTS

| 4,445,276 A | * | 5/1984 | Voneky et al. ............... 33/502 |
| 4,729,654 A | * | 3/1988 | Akuta et al. ............... 356/4.5 |
| 4,884,889 A | * | 12/1989 | Beckwith, Jr. ............... 33/503 |
| 4,962,591 A | * | 10/1990 | Zeller et al. ............... 33/502 |
| 5,269,067 A | * | 12/1993 | Waeldele et al. ............... 33/502 |
| 5,535,004 A | * | 7/1996 | Johnston et al. ............... 356/358 |
| 5,681,981 A | * | 10/1997 | McMurtry ............... 73/1 J |
| 5,983,512 A | * | 11/1999 | Trapet ............... 33/502 |
| 6,023,850 A | * | 2/2000 | Trapet ............... 33/502 |
| 6,226,092 B1 | * | 5/2001 | de Laga ............... 356/512 |

FOREIGN PATENT DOCUMENTS

| JP | 10141904 A | * | 5/1998 | ............ G01B/5/00 |
| JP | 10300452 A | * | 11/1998 | ............ G01B/21/00 |

* cited by examiner

Primary Examiner—Diego Gutierrez
Assistant Examiner—Mirellys Jagan
(74) Attorney, Agent, or Firm—Oblon, Spivak, McClelland, Maier & Neustadt, P.C.

(57) ABSTRACT

A ball step gauge includes a gauge framework that is H-shaped in cross-section and has a horizontal frame. A plurality of holes are formed at predetermined intervals in the horizontal frame in an axial direction of the horizontal frame. A plurality of grooves are formed around each of the holes. A plurality of balls are inserted under pressure in the holes, with centers of the balls existing on a neutral axis of moment of inertia of an area of the gauge framework. Since the ball intervals are less liable to change, the ball step gauge can be used as a reliable standard gauge for calibrating coordinate measuring machines.

6 Claims, 7 Drawing Sheets

BALL STEP GAUGE

BACKGROUND OF THE INVENTION

1. Field of the Invention

The present invention relates to a ball step gauge that is a standard gauge for calibrating, measuring or examining the accuracy of the length measurement of a coordinate measuring machine, a machine tool, a machining center, etc.

2. Discussion of the Background

A previous technology coordinate measuring machine is a machine for measuring the dimensions and shape of a workpiece using coordinate points X, Y and Z interspersed in a three-dimensional space with the aid of a computer. To be specific, the workpiece under measurement placed on a table and a probe attached to the end of a Z-axis of the measuring machine are relatively moved in the three-dimensional directions of X, Y and Z, moments of contact of the probe with the workpiece are ascertained, coordinate values in the directions of the moving axes are read using the moments as electrical triggers, and the dimensions and shape of the workpiece are measured using the computer.

Generally, coordinate measuring machines are required to measure a workpiece with particularly high accuracy. In order to guarantee high-accuracy measurement, a coordinate measuring machine has to be subjected to accuracy examination frequently, and values obtained by the measurement with the coordinate measuring machine are calibrated using the accuracy examination results as calibration values or the coordinate measuring machine is finely adjusted. This accuracy examination requires use of a gauge as the standard. The gauge is required to enable evaluation of values detected by the probe of the coordinate measuring machine when it is moved three-dimensionally.

A first important target for researchers was how the error of each axis in the coordinate measuring machine should be measured. Therefore, a gauge was first invented for the purpose of measuring such errors of the coordinate measuring machine. It is now widely known that, fundamentally, the errors should be measured by measuring a sphere or spheres. For this reason, research has turned to a second target of determining how the sphere or spheres should be arranged in a gauge for measurement and evaluation. Various attempts have been made to arrange the spheres in one same plane and arrange them in the three-dimensional space.

Figure 9:
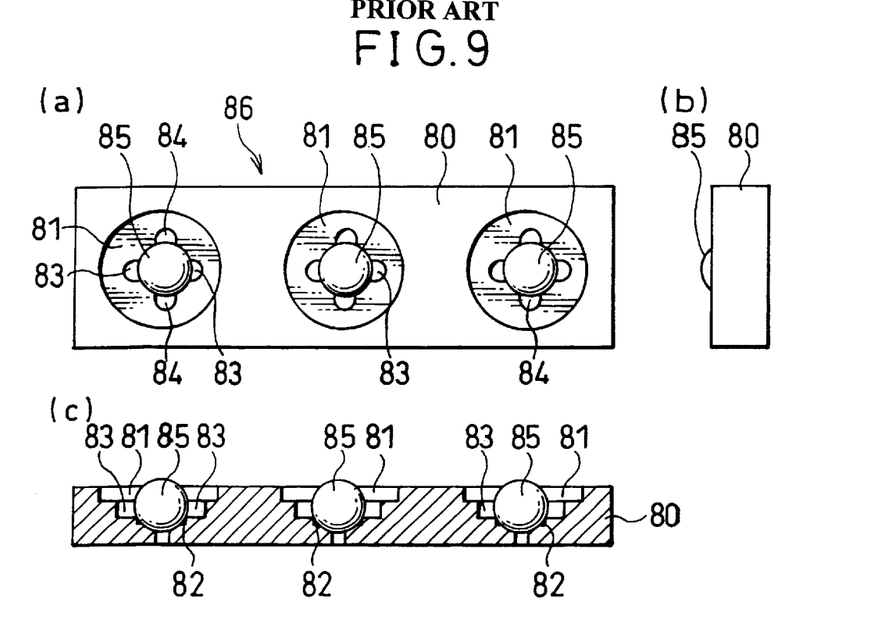
Figure 10:
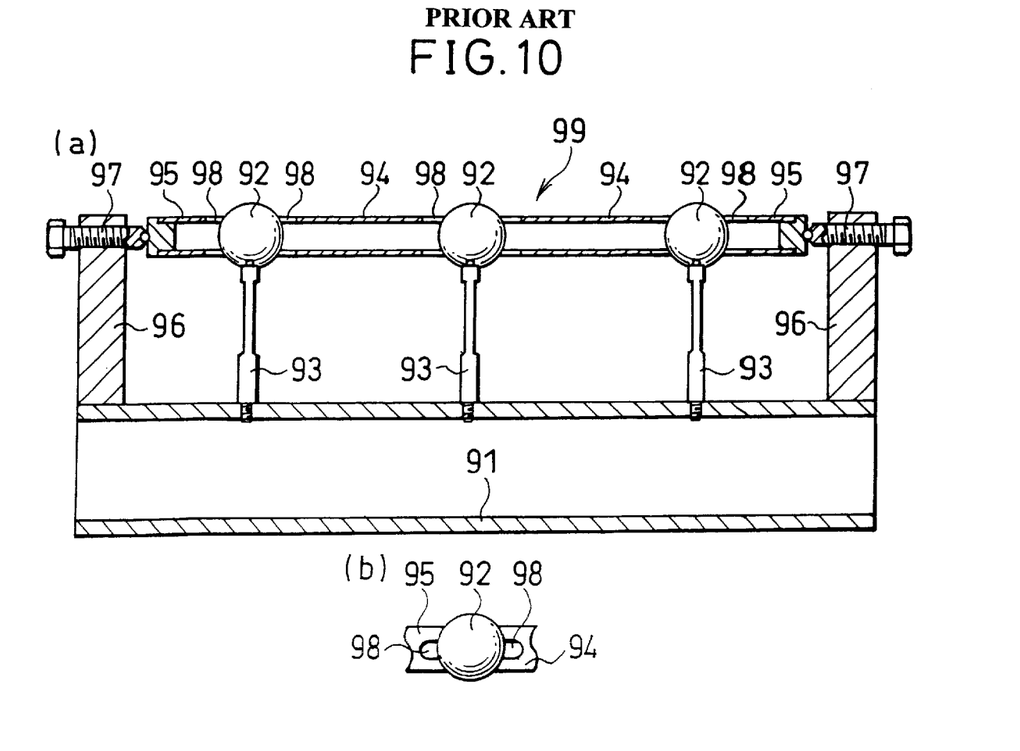

As a ball gauge using spheres, ball step gauges each with plural spheres arranged linearly as shown in FIG. 9 and FIG. 10 have been widely used. The ball step gauge 86 shown in FIG. 9 comprises a gauge frame body 80 in which three circular holes 81 are formed, a ball receiving portion 82 formed at the center bottom of each circular hole, probe insertion grooves 83, 83 formed around and across the ball receiving portion and opposed in the lengthwise direction of the gauge frame body, probe insertion grooves 84, 84 formed opposite to each other in the direction orthogonal to the direction in which the first mentioned probe insertion grooves are disposed, and a highly precise spherical ball 85 fixed on the ball receiving portion 82.

A coordinate measuring machine is calibrated, for example, using this ball step gauge 86 by placing the ball step gauge 86 on and fixing it to a table, bringing the probe of the coordinate measuring machine into contact with at least four points on the outer periphery of a ball 85 that is, for example, a rightmost one in the figure to measure the center position of that ball by computation, and successively measuring the positions of the remaining balls in the same manner. The distance between adjacent balls obtained from the ball positions has been calibrated by a high-precision coordinate measuring machine. The results of measurement are compared with the calibrated distance value to calibrate the coordinate measuring machine.

In another prior art ball step gauge shown in FIG. 10(a), three supports 93 each having a ball 92 fixed thereto are fixed onto a base frame body 91. Each support 93 is partially chipped off to have a leaf-spring effect, so that the ball 92 supported on the tip of the support is laterally swingable. Between the center ball and each of the right and left balls is disposed a connection pipe 94 whose opposite end faces in contact with the balls have a shape conforming to the outer shape of the balls 92. A pair of support frames 96 rise from the opposite ends of the base frame body 91, and a pressure application pipe 95 interposes between each of the right and left balls and each of the support frames. The connection pipes are pressed by screws 97 driven into the support frames. The distance between adjacent balls can be determined in accordance with the effective length of the connection pipes 94. The end faces of the pressure application pipes 95 in contact with the balls 92 have a shape conforming to the outer shape of the balls 92, similarly to the end faces of the connection pipes 94.

FIG. 10(b) is a plan view showing a part of FIG. 10(a) and, as shown, probe insertion grooves 98 are formed at portions at which the connection pipes 94 and pressure application pipes 95 abut on the balls 92 and have the same function as the probe insertion grooves 83 of the ball step gauge 86 shown in FIG. 9. The distance between adjacent balls 92 of the ball step gauge 99 has also been calibrated by a high-precision coordinate measuring machine. The ball positions are successively measured in the same manner as in the ball step gauge shown in FIG. 9, and the results of measurement are compared with the calibrated distance value to enable the ball step gauge 99 to calibrate a coordinate measuring machine.

In the ball step gauges shown in FIG. 9 and FIG. 10, since the distance between adjacent balls is measured by a high-precision coordinate measuring machine, the precision of the distance is somewhat high. However, when a difference in temperature is produced between the upper and lower sides and/or between the right and left sides of the frame body due to external thermal turbulence, the temperature difference gives rise to thermal expansion of the frame body. As a result, the frame body exhibits a bimetallic effect and is bent to lower the precision of the ball step gauge.

SUMMARY OF THE INVENTION

The present invention can solve the above problems and aims at providing a ball step gauge in which dimensional changes in the distance between adjacent balls are less liable to entail even when a framework is bent by its own bimetallic effect resulting from thermal expansion caused by the temperature difference between the upper and lower sides and/or between the right and left sides of the framework due to external thermal turbulence, and are very small even when the framework serving as an elastic support beam is elastically deformed by its own static load.

The ball step gauge of the present invention comprises a gauge framework that is H-shaped in cross section, a plurality of holes formed at predetermined intervals in a horizontal frame of the gauge framework in an axial direction of the horizontal frame, a plurality of grooves formed around each of the holes, and a plurality of balls inserted under pressure in the holes, with centers of the balls existing on a neutral axis of moment of inertia of area of the gauge framework.

As described above, since the centers of all the balls exist on the neutral axis of the second moment of area of the gauge framework, the dimensions of the ball intervals are difficult to change even when the framework is bent by exterior thermal turbulence. Furthermore, since the framework is an elastic support beam, it is elastically deformed as a beam by its own static load. However, the changes in the ball intervals can be made small.

Moreover, by providing restraint surfaces for preventing a ball interval measuring interferometric stepper from rolling, in parallel to the axis along which the balls are arranged, an accurate ball step gauge can be obtained.

BRIEF DESCRIPTION OF THE DRAWINGS

FIG. 1(a) is a plan view showing one embodiment of a ball step gauge according to the present invention, FIG. 1(b) a side view of the ball step gauge in FIG. 1(a), and FIG. 1(c) a perspective view of the ball step gauge in FIG. 1(a).

FIG. 6(a) is a cross sectional view showing a mirror holder used for the interferometic stepper in FIG. 2, FIG. 6(b) a left side view of the mirror holder in FIG. 6(a), FIG. 6(c) a right side view of the mirror holder in FIG. 6(a), and FIG. 6(d) a partial plan view showing the state of contact between a V-shaped channel and a small sphere of the mirror holder in FIG. 6(a).

FIG. 9(a) is a plan view showing a prior art ball step gauge, FIG. 9(b) a cross sectional view of the ball step gauge in FIG. 9(a), and FIG. 9(c) a longitudinal cross sectional view of the ball step gauge in FIG. 9(a).

FIG. 10(a) is a cross sectional view showing another prior art ball step gauge, and FIG. 10(b) a partial plan view of the ball step gauge in FIG. 10(a).

DESCRIPTION OF THE PREFERRED EMBODIMENTS

Figure 1:
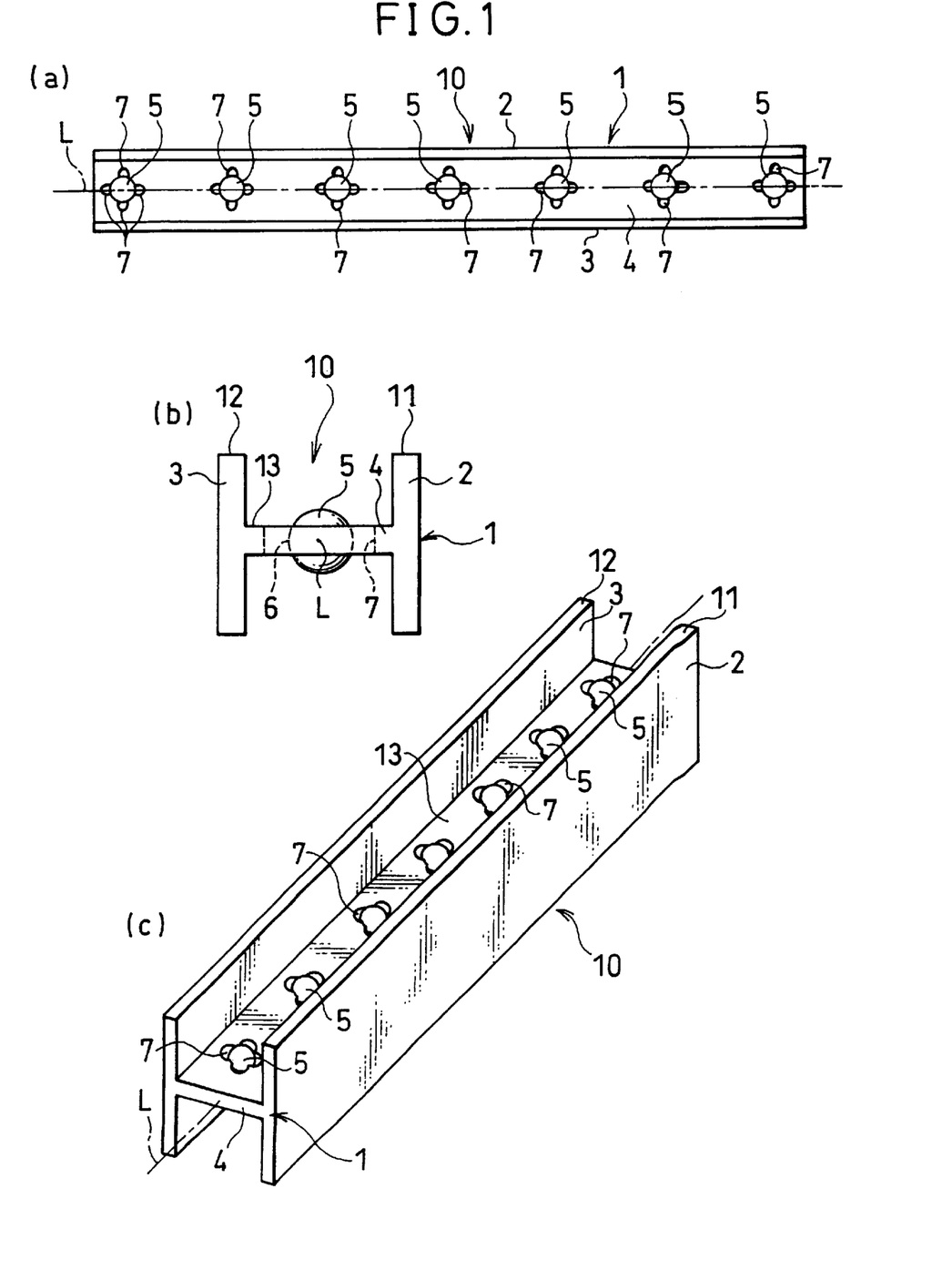

A ball step gauge according to the present invention will be described with reference to the drawings. FIG. 1 shows one embodiment of the ball step gauge according to the present invention, in which a gauge framework 1 comprises a right vertical frame 2, a left vertical frame 3 and a horizontal frame 4 connecting the right and left vertical frames 2 and 3 at their respective intermediate height, and constructs an H shape in cross section as shown in FIG. 1(b) and FIG. 1(c).

The horizontal frame 4 of the gauge framework 1 is formed with holes 6 for insertion of balls 5, that are arranged at predetermined intervals along the central axial direction of the horizontal frame. The balls 5 are inserted under pressure in the holes 6 and are integral with the gauge framework 1. The balls 5 are pressure-inserted in and fixed to the gauge framework 1 so that the centers of the balls 5 exist on a neutral axis L of moment of inertia of area of the gauge framework 1 H-shaped in cross section.

Four grooves 7 are formed around each ball 5 pressure-inserted in the hole 6 of the gauge framework 1 and are spaces necessary for a movable probe of a coordinate measuring machine to contact the ball 5 when measuring the ball intervals of the ball step gauge 10 using the coordinate measuring machine.

In FIG. 1(a), the axis L is the neutral axis of moment of inertia of area of the gauge framework 1 as described above and the centers of all the balls 5 are positioned on the axis L. Therefore, the axis L is also a central axis along which the balls 5 are arranged.

The top end faces 11 and 12 of the vertical frames 2 and 3 in the state of use of the gauge framework 1 and the top and bottom faces 13 of the horizontal frame 4 that are parallel to the axis L serve as restraint surfaces for preventing an interferometric stepper for measurement of a ball step gauge from rolling. One of the faces is suitably selected as a rolling-preventing surface in view of the dimensions of the H-shaped cross section, the shape and dimensions of the interferometric stepper, etc. or from the standpoint of the structural design.

In the ball step gauge 10 thus constructed, since the centers of all the balls 5 are positioned on the neutral axis of the moment of inertia of area of the gauge framework 1, dimensional changes in the distance between adjacent balls are less liable to entail even when the gauge framework is bent by its own bimetallic effect resulting from thermal expansion caused by the temperature difference between the upper and lower sides and/or between the right and left sides of the gauge framework due to external thermal turbulence. The gauge framework of the ball step gauge 10 is elastically deformed by its own static load because it is an elastic support beam. Even if such elastic deformation should be caused, however, changes in the ball intervals can be made minute. Therefore, the ball step gauge is extremely precise. A coordinate measuring machine can accurately be calibrated with the ball step gauge even by a conventional calibrating method.

After fabrication of the above constructed ball step gauge 10, the position of each ball has to be calibrated. The ball positions have heretofore been measured using a coordinate measuring machine as precise as possible. However, since the accuracy of the measured positions falls within the precision of the precise coordinate measuring machine, the prior art ball step gauge is only effective as a standard gauge for calibrating coordinate measuring machines lower in precision than the precise coordinate measuring machine.

Generally, the error of a standard gauge for calibrating a measuring device is preferably calibrated in the range of about ⅕ to about ⅒ better than that of the measuring device. In recent years the precision of coordinate measuring machines has been considerably enhanced. A coordinate measuring machine having an error of not more than 1 µm for 500 mm measurement is available. However, there is no coordinate measuring machine having an error of 0.2 µm that is ⅕ the aforementioned error of 1 µm. In case where calibration of a coordinate measuring machine having an error of 1 µm is performed using a standard gauge having an error of 1 µm, contradiction will arise in terms of traceability of length.

In order to solve the above contradiction, therefore, an interferometric stepper 20 as shown in FIG. 2 through FIG. 8, for example, is preferably used, so that interferometric length measurement can be performed using a wavelength of light that is the length standard directly as the measurement standard when the distance between adjacent balls is measured and so that more accurate calibration can be effected quickly obeying the Abbe's principle during the distance measurement.

Figure 2:
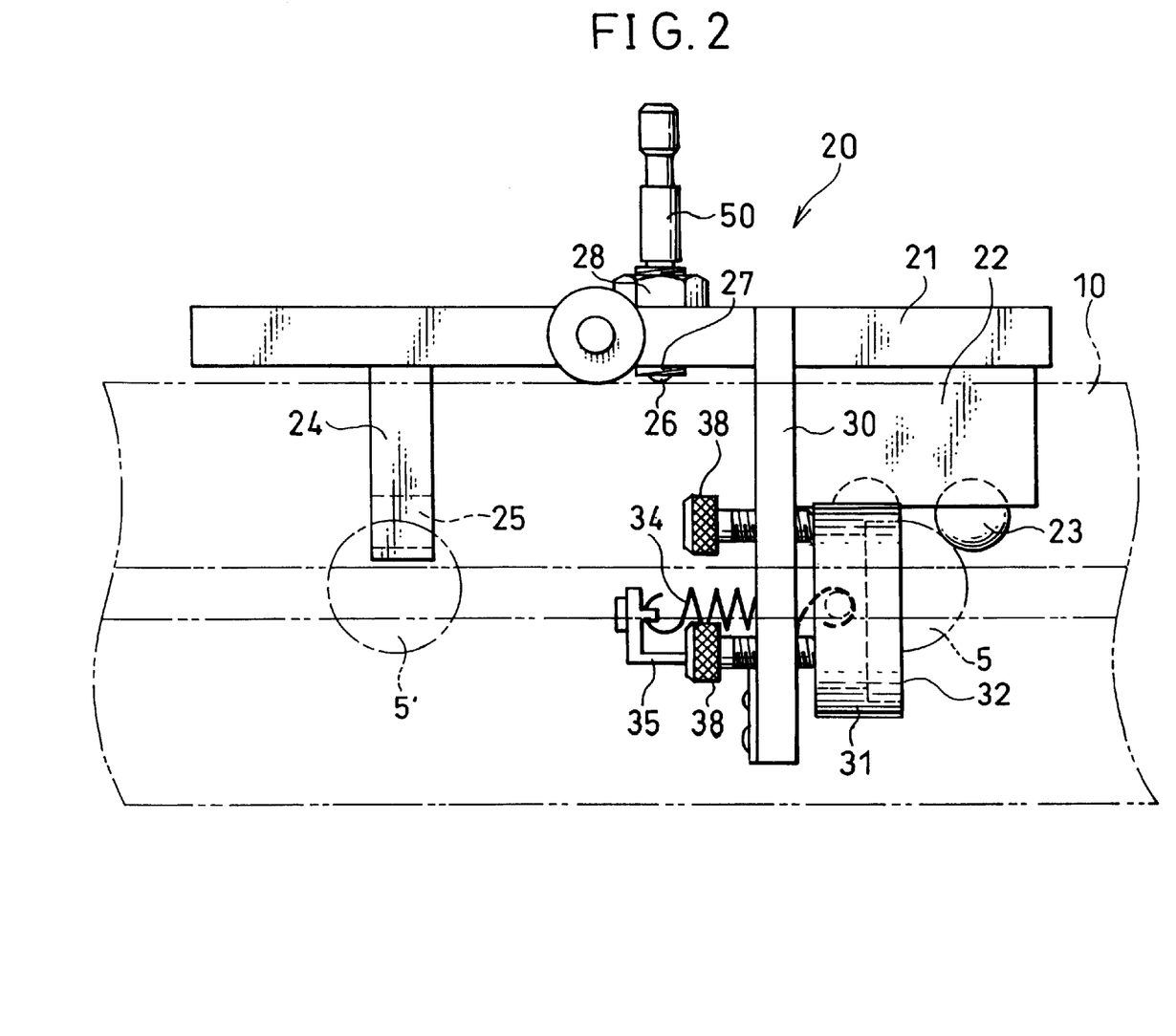
FIG. 2 is a front view showing an interferometric stepper for measuring the distance between adjacent balls using the ball step gauge according to the present invention.
Figure 3:
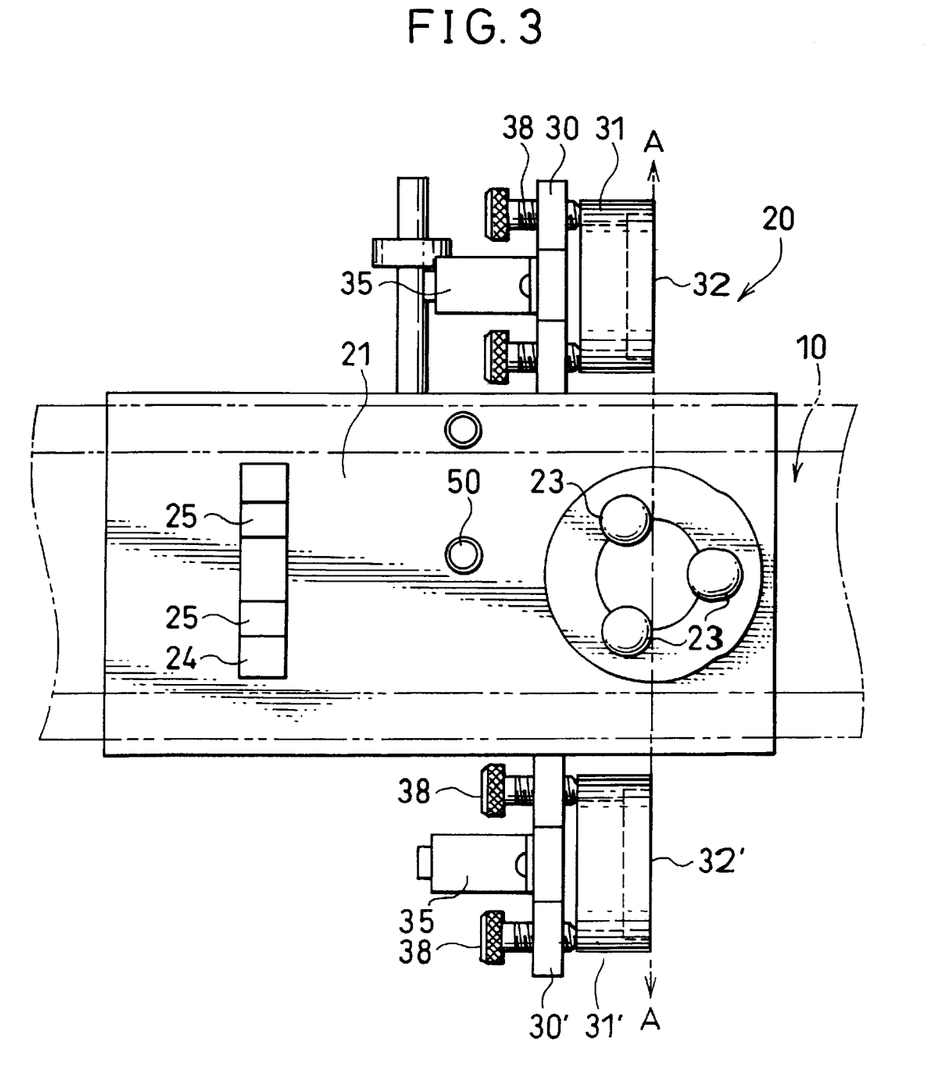
FIG. 3 is a bottom view of the interferometric stepper in FIG. 2.
Figure 4:
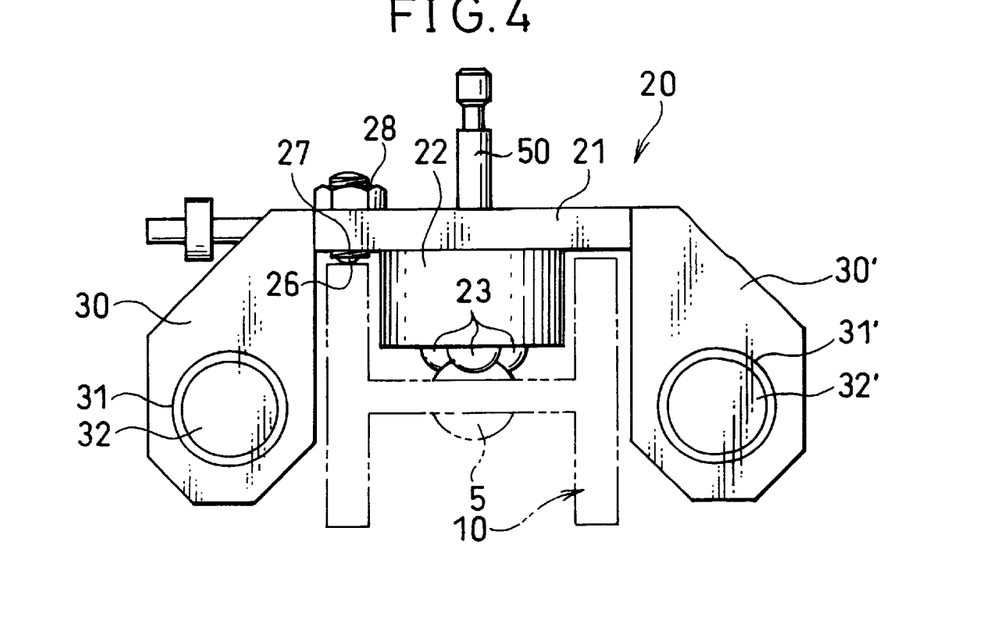
FIG. 4 is a right side view of the interferometric stepper in FIG. 2.
Figure 5:
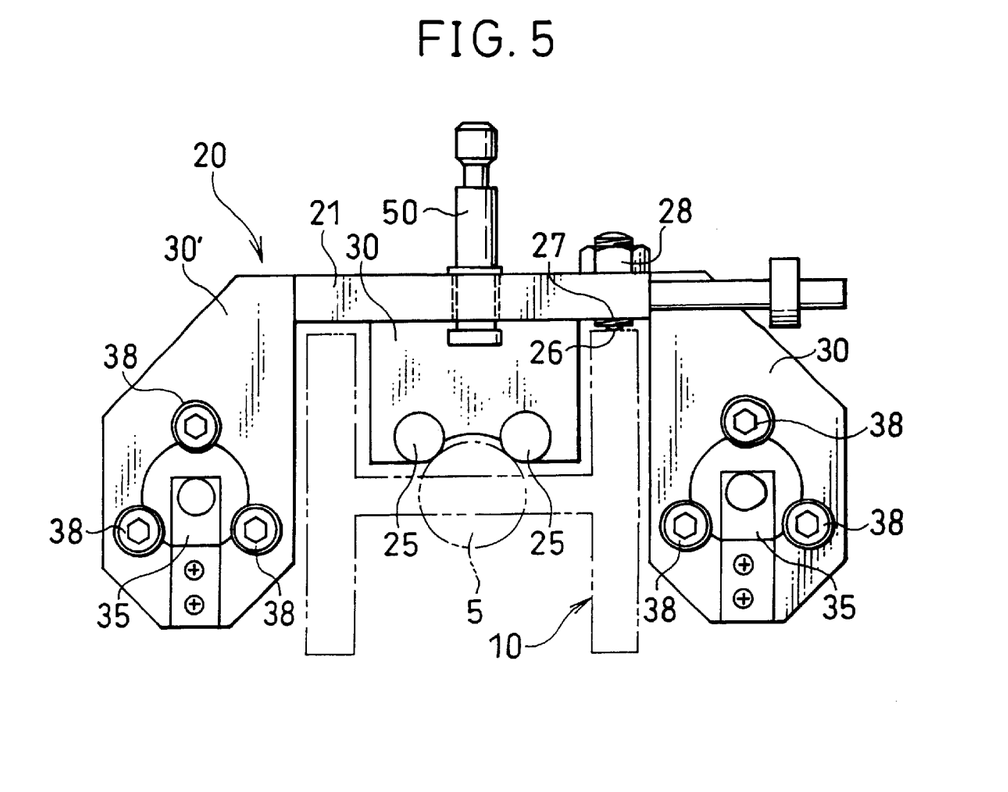
FIG. 5 is a left side view of the interferometric stepper in FIG. 2.
Figure 6:
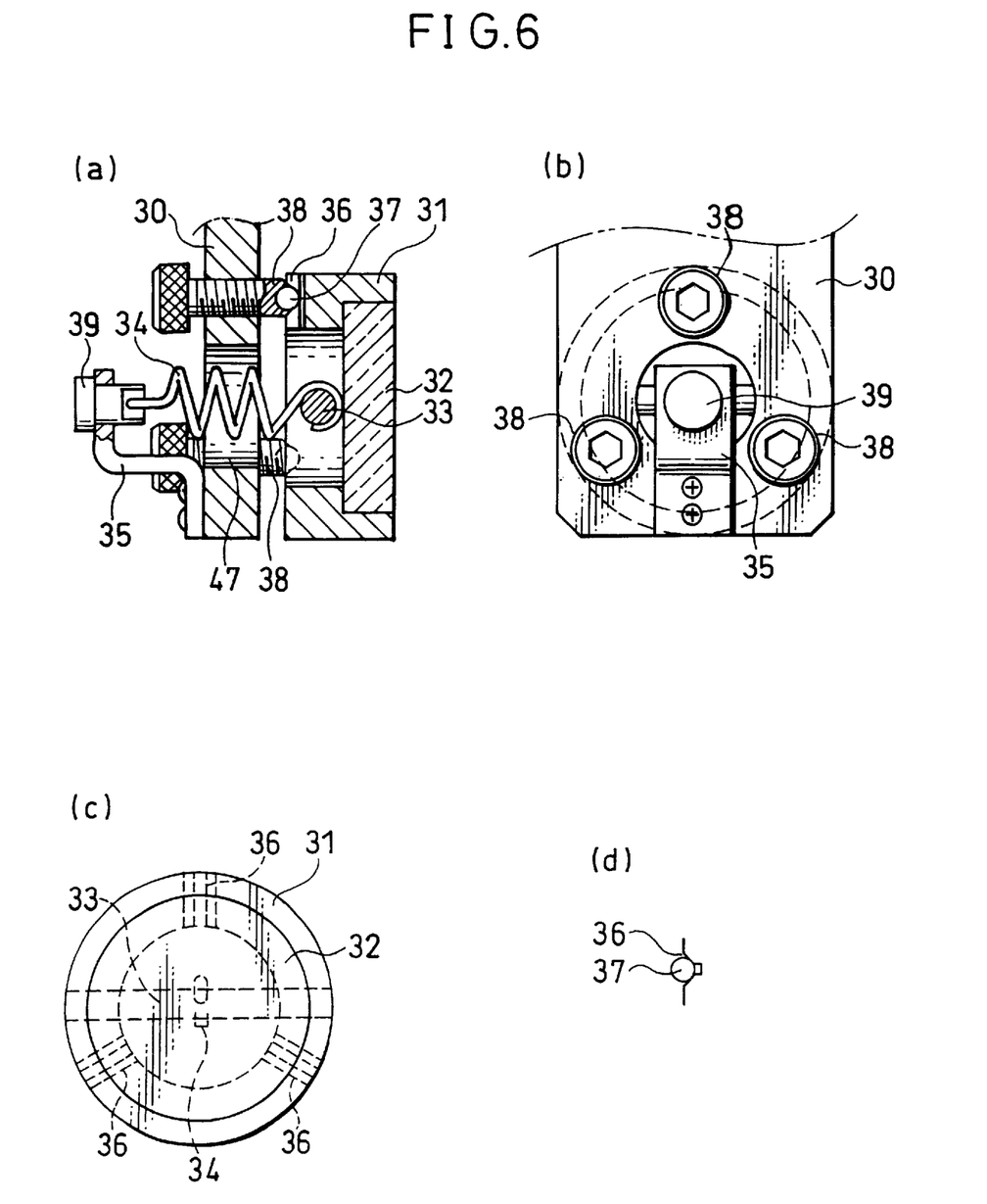
Figure 7:
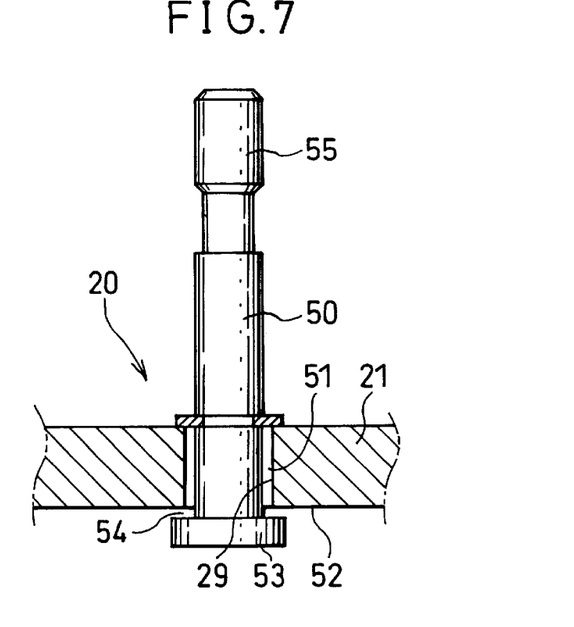
FIG. 7 is an enlarged side view showing a shaft portion of the mirror holder in FIG. 2.

FIG. 2 is a front view of the interferometric stepper 20, in which balls 5 and 5' of the ball step gauge 11 are shown in two-dot chain lines. FIG. 3 is a bottom view thereof. FIG. 4 is a right side view of the stepper and FIG. 5 is a left side view thereof, in which the H-shaped framework and ball 5 or 5' of the ball step gauge 10 are also shown in two-dot chain lines. FIG. 6 shows a reflection optical system used for the interferometric stepper 20, and FIG. 7 is an enlarged side view of a shaft used for the interferometric stepper 20.

As shown in FIG. 2 TO FIG. 5, the light-wave interference stepper 20 comprises an upper plate 21, a first spacer 22 fixed to the upper plate, and three spherical bodies 23, such as steel or ceramic balls, fixed on the lower surface of the first spacer 22 and arranged concentrically at angular intervals of 120 degrees. A seat surface constituted of the three spherical bodies 23 and engaging with the ball 5 or 5' is called a three-sphere spherical seat and can stably support the ball 5 thereon.

A second spacer 24 in addition to the first spacer 22 is fixed to the upper plate 21 of the interferometric stepper 20. The second spacer 24 has at the lower portion thereof a pair of cylindrical holes with a circumferential segment removed, that are parallel to each other and to the axis L along which the balls 5 are arranged. A cylindrical rod 25 is inserted under pressure into each of the cylindrical holes, and project from the circumferential segments of the cylindrical holes and contact the ball 5' at two points in total. It is preferable to use cylindrical rollers for a rolling bearing as the cylindrical rods 25. A structure as a substitute for the structure of the cylindrical rods 25 arranged in parallel is such that V-shaped surfaces are arranged by two planes intersecting each other or such that the bottom surface of the spacer 24 is formed to have a V-shaped notch. In either substitute structure, contact with the ball 5 or 5' at two points can be attained to obtain the same effect as described above. However, use of the cylindrical rods 25 constituted of cylindrical rollers for a rolling bearing as described above it is superior to use of the two substitutes in the aspect enabling reduction of a friction force relative to the ball surface.

The interferometric stepper 20 is disposed on the two adjacent balls 5 and 5' of the ball step gauge 10 in a straddling manner. As is well known, there are six degrees of freedom for the position and posture of a rigid body in a space. In order to completely restrain the stepper 20 relative to the ball step gauge 10, therefore, one more point restraint is required in addition to the five-point restraint, namely three-point restraint by the three-sphere spherical seat and the two-point restraint of the ball 5' by the cylindrical rods 25. The sixth restraint is attained by a small ball 26 that projects downward from the upper plate 21 to abut against the end face of one of the vertical frames that serves as a surface preventing the ball step gauge 10 from rolling. The small ball 26 is fixed to the lower end of an adjustment screw 27. The adjustment screw 27 is helically engaged with the upper plate 21 and, after being adjusted vertically, is locked relative to the upper plate 21 by means of a nut 28. As described herein before, the upper surface of the horizontal frame can be used as the rolling prevention surface, in place of the end face of the vertical frame.

By constructing the interferometric stepper 20 as described above and placing the interferometric stepper 20 on the two balls 5 and 5' in a straddling manner, the six degrees of freedom of a rigid body in a space can be completely restrained. Therefore, a coordinate measuring machine can be accurately calibrated with ease.

Mirror support arms 30 extend from both sides of the upper plate 21 of the interferometric stepper 20. As shown in FIG. 6(a) to FIG. 6(d), a mirror holder 31 is positioned at and fixed to each mirror support arm 30.

As shown in FIG. 6, a reflecting mirror 32 is fixed to the mirror holder 31. A spring engagement pin 33 is fixed to the mirror holder 31. One of the hook parts of a tension spring 34 is engaged with the spring engagement pin 33. The other hook part of the tension spring 34 is engaged with a spring stopper 39 of a spring engagement arm 35 fixed to the back surface of the mirror support arm 30. The tension spring 34 passes through a through hole 47 formed in the mirror support arm 30 and tensions the mirror holder 32 in the leftward direction in FIG. 6(a), with the center of the mirror holder registering with the intersecting point of V-shaped channels 36.

As shown in FIG. 6(c), three V-shaped channels 36 are radially formed at angular intervals of 120 degrees in the surface of the mirror holder 31 opposite its surface on which the reflecting mirror 32 is mounted. A small sphere 37 is disposed in each V-shaped channel 36 and brought into intimate contact therewith at two points by the tension force of the tension spring. Since there are three small spheres 37, the mirror holder 31 is stably restrained relative to the mirror support arm 30 at six points in total. Each small sphere 37 is fixed to the tip of an adjuster screw 38 helically engaged with the mirror support arm 30.

Since a support and adjustment apparatus in an optical reflecting system is constructed as described above, the reflection surface of the reflecting mirror 32 can be adjusted to exactly agree with line A—A in FIG. 3 passing through the center of the three-sphere spherical seat of the interferometric stepper 20 by driving and adjusting the three adjuster screws 38 and easily adjusted to have a posture perpendicular to the interference light axis. Further, a corner cube generally used as an optical reflecting device or other reflecting devices can be used in place of the aforementioned reflecting mirror.

Figure 8:
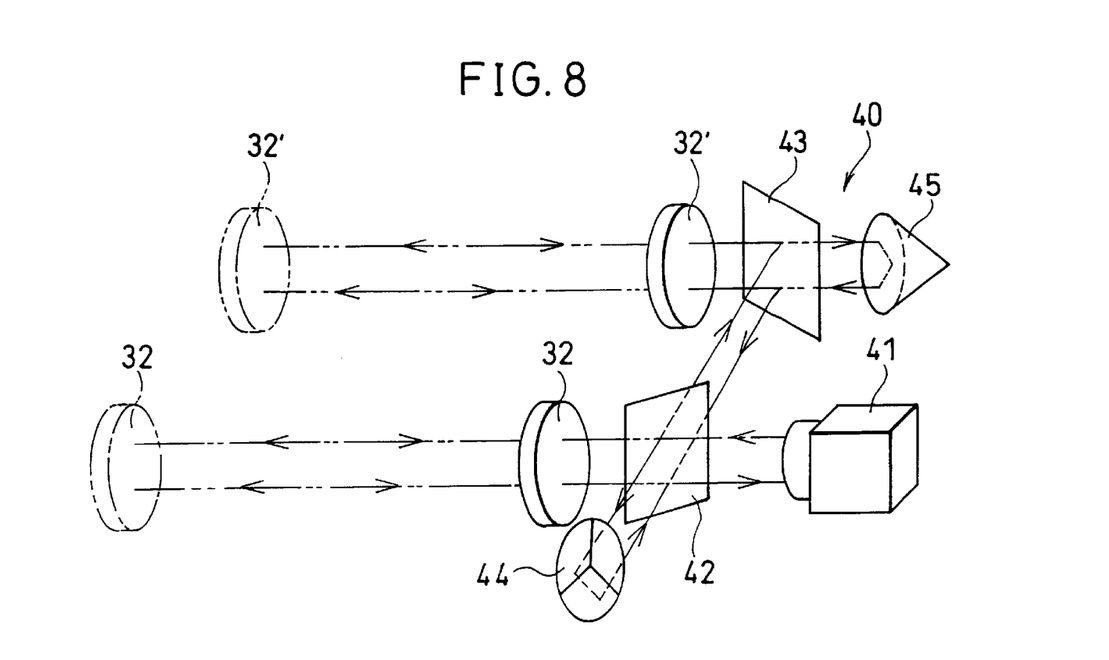
FIG. 8 is an explanatory view showing the principle of an optical system for interferometric measurement adopted the interferometric stepper of FIG. 2 is used.

When measuring the ball interval in the ball step gauge 10 using the interferometric stepper 20, a known interferometric measuring apparatus 40 is used. As shown in FIG. 8 showing the principle of an optical system, the apparatus comprises a light emitter-receiver 41, a first half mirror 42, a second half mirror 43, a first reflecting prism 44 and a second reflecting prism 45. Light beams from the first and second half mirrors 42 and 43 are projected onto the reflecting mirrors 32 and 32' disposed on the opposite sides of the interferometric stepper 20. Based on the reflected light received by the light emitter-receiver, the positions of the reflecting mirrors 32 and 32' and the center positions of the balls 5 are accurately measured.

The positions of the reflection surfaces of the reflecting mirrors 32 and 32' positioned and determined by a first ball 5 and a second ball 5' of the ball step gauge 10 are set as a zero point that is the measurement origin. The interferometric stepper 20 is then moved to the position of the second and a third balls to measure the positions in the same manner as described above and shown by two-dot chain lines in FIG. 8. The movement and measurement are repeated to measure the positions of the respective balls of the ball step gauge, thereby enabling the measurement of the ball intervals. The interval between last pair of balls can be measured by changing the direction of the ball step gauge and performing the interferometric measurement in the same manner as described above. Thus, all the ball intervals can be calibrated using the wavelength of light directly as the measurement standard. This measurement is more accurate than the conventional measurement using a coordinate measuring machine. Therefore, an extremely precise ball step gauge can be obtained.

When necessary, the same interferometric measurement is further performed with the ball step gauge directed reversely, thereby measuring the ball intervals in the two directions, and the two measurement values are averaged. As a result, a more precise ball step gauge can be obtained.

The interferometric stepper 20 is lifted in order to avoid the interference between the balls 5 and the interferometric stepper 20 and moved horizontally and downward to the next ball position. The vertical movement can be attained by utilizing the function of the Z-axis of a coordinate measuring machine and chucking a shaft 50 with the Z-axis. The horizontal movement can also be attained by utilizing the function of the X-axis of the coordinate measuring machine and directly moving the interferometric stepper 20. When using a moving-table type coordinate measuring machine, the ball step gauge 10 is moved horizontally by utilizing the X-axis function.

Even when the interferometric stepper 20 in FIG. 3 or FIG. 4 is laterally inclined, for example, since a line connecting the centers of the reflecting mirrors 32 and 32' is always inclined about the axis passing through the balls 5 and 5', the Abbe's principle can be obeyed, enabling accurate measurement at all times.

FIG. 7 is an explanatory view showing the state of fitting between the upper plate 21 of interferometric stepper 20 and the shaft 50 for moving the interferometric stepper 20 when effecting the aforementioned interferometric measurement. As shown, it is preferable to form a hole 29 for the shaft 50 in the upper plate 21 with a small fitting gap 51 left between the shaft and the upper plate and to leave a small gap 54 between the lower surface 52 of the upper plate 21 and a flange 53 formed on the lower end of the shaft 50. This is a countermeasure so as not to form further restraint in addition to the six-point restraint of the ball step gauge 10 when the lower end of the Z-axis of the coordinate measuring machine is connected to the shaft 50 at the upper part 55 of the shaft. Thus, it is required to retain the gap in the radial direction of the hole 29 for the shaft 50 relative to the upper plate 21 when the interference measurement is made. When the shaft 50 is firmly fixed to the upper plate 21, it is required to adopt a countermeasure, such as provision of a support device enabling a gap to be left between the upper part 55 of the shaft 50 and the lower end of the Z-axis of the coordinate measuring machine.

Industrial Applicability

Since the ball step gauge according to the present invention is constructed as described above, dimensional changes in the distance between adjacent balls are less liable to entail even when its framework is bent by its own bimetallic effect resulting from thermal expansion caused by the temperature difference between the upper and lower sides and/or between the right and left sides of the framework due to external thermal turbulence. Further, when the framework serving as an elastic support beam is elastically deformed by its own static load, the ball step gauge exhibits a very small change in the ball interval. Moreover, the ball step gauge allows a wavelength of light that is the length standard to be directly used as the measurement standard when the distance between adjacent balls is measured.

Since the ball intervals are less liable to change, the ball step gauge can be used as a reliable standard gauge for calibrating coordinate measuring machines.

What is claimed is:

1. A ball step gauge comprising a gauge framework that is H-shaped in cross section, a plurality of holes formed at predetermined intervals in a horizontal frame of the gauge framework in an axial direction of the horizontal frame, a plurality of grooves formed around each of the holes, and a plurality of balls inserted under pressure in the holes, with centers of the balls existing on a neutral axis of moment of inertia of area of the gauge framework.

2. A ball step gauge according to claim 1, wherein the gauge framework has a restraint surfaces formed in parallel to an axis along which the balls are arranged, for preventing rolling of an interferometric stepper for measuring an interval between balls.

3. A ball step gauge according to claim 1, wherein said horizontal frame comprises a single frame within which said balls are fixed by being pressure-inserted into said holes in said frame.

4. A ball step gauge according to claim 1, wherein said framework comprises first and second vertical frames which have top end faces which are parallel to said neutral axis.

5. A ball step gauge according to claim 4, wherein top and bottom faces of said horizontal frame are parallel to said neutral axis.

6. A ball step gauge according to claim 1, wherein top and bottom faces of said horizontal frame are parallel to said neutral axis and said balls are centered at a position located between said top and bottom faces of said horizontal frame.

* * * * *